US012003143B2

(12) United States Patent
Sridharan et al.

(10) Patent No.: US 12,003,143 B2
(45) Date of Patent: Jun. 4, 2024

(54) FLEXIBLE MECHANICAL SUPPORT SYSTEM FOR DIODES IN A ROTATING RECTIFIER

(71) Applicant: GE Aviation Systems LLC, Grand Rapids, MI (US)

(72) Inventors: Balamurugan Sridharan, Bangalore (IN); Mamatha Ramakrishnaiah, Bangalore (IN); Mohammad Khaja Mohiddin Shaik, Bangalore (IN); Xiaochuan Jia, Centerville, OH (US); Hao Huang, Troy, OH (US)

(73) Assignee: GE Aviation Systems, LLC, Grand Rapids, MI (US)

(*) Notice: Subject to any disclaimer, the term of this patent is extended or adjusted under 35 U.S.C. 154(b) by 90 days.

(21) Appl. No.: 17/405,160

(22) Filed: Aug. 18, 2021

(65) Prior Publication Data

US 2022/0069673 A1 Mar. 3, 2022

(30) Foreign Application Priority Data

Aug. 31, 2020 (IN) .............................. 202011037519

(51) Int. Cl.
*H02K 11/042* (2016.01)
*B64D 27/24* (2006.01)

(52) U.S. Cl.
CPC ........... *H02K 11/042* (2013.01); *B64D 27/24* (2013.01)

(58) Field of Classification Search
CPC .... H02K 11/042; H02K 7/1823; B64D 27/24; H02M 7/003; H02M 7/006
See application file for complete search history.

(56) References Cited

U.S. PATENT DOCUMENTS

| 3,721,843 | A | 3/1973 | Spisak et al. |
| 7,166,943 | B2 | 1/2007 | Johnsen |
| 7,586,224 | B2 | 9/2009 | Osborn et al. |

(Continued)

FOREIGN PATENT DOCUMENTS

EP 1788693 A1 5/2007

OTHER PUBLICATIONS

Gohil et al., Turning by electric discharge machining: A review, 2017, Proceedings of the Institution of Mechanical Engineers, Part B: Journal of Engineering Manufacture, vol. 231(2), 195-208 (Year: 2017).*

(Continued)

*Primary Examiner* — Tulsidas C Patel
*Assistant Examiner* — Joshua Kiel M Rodriguez
(74) *Attorney, Agent, or Firm* — Dority & Manning, P.A.

(57) ABSTRACT

A rotating rectifier associated with an electric machine is provided. In one example aspect, a rotating rectifier includes a diode. The diode can be one diode of a stage of diodes. The rotating rectifier can also include a connection lead, such an exciter connection lead. The connection lead has a diode contact segment in contact with the diode and a first spring segment and a second spring segment positioned on opposite sides of the diode contact segment. The first spring segment and the second spring segment can be positioned adjacent to the diode contact segment. The first spring segment and the second spring segment each have one or more spring laps. The spring laps can be non-planar spring laps, such as undulating spring laps.

17 Claims, 7 Drawing Sheets

(56) References Cited

U.S. PATENT DOCUMENTS

| | | | |
|---|---|---|---|
| 7,868,494 B2 | 1/2011 | Grosskopf et al. | |
| 7,944,100 B2 | 5/2011 | Lemmers, Jr. et al. | |
| 9,369,029 B2 | 6/2016 | Hasan et al. | |
| 2007/0108854 A1* | 5/2007 | Osborn | H02K 11/042 363/145 |
| 2018/0316248 A1* | 11/2018 | Patel | H02K 11/042 |

OTHER PUBLICATIONS

Uriondo et al. The present and future of additive manufacturing in the aerospace sector: A review of important aspects, 2017, Proceedings of the Institution of Mechanical Engineers, Part G: Journal of Aerospace Engineering, vol. 229(11), 2132-2147 (Year: 2015).*

* cited by examiner

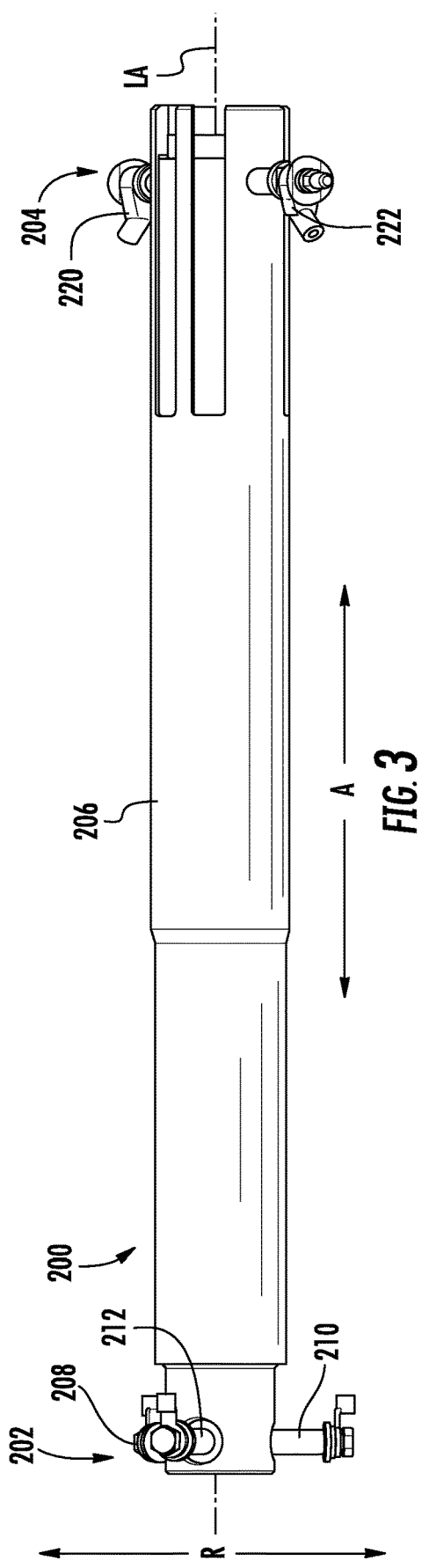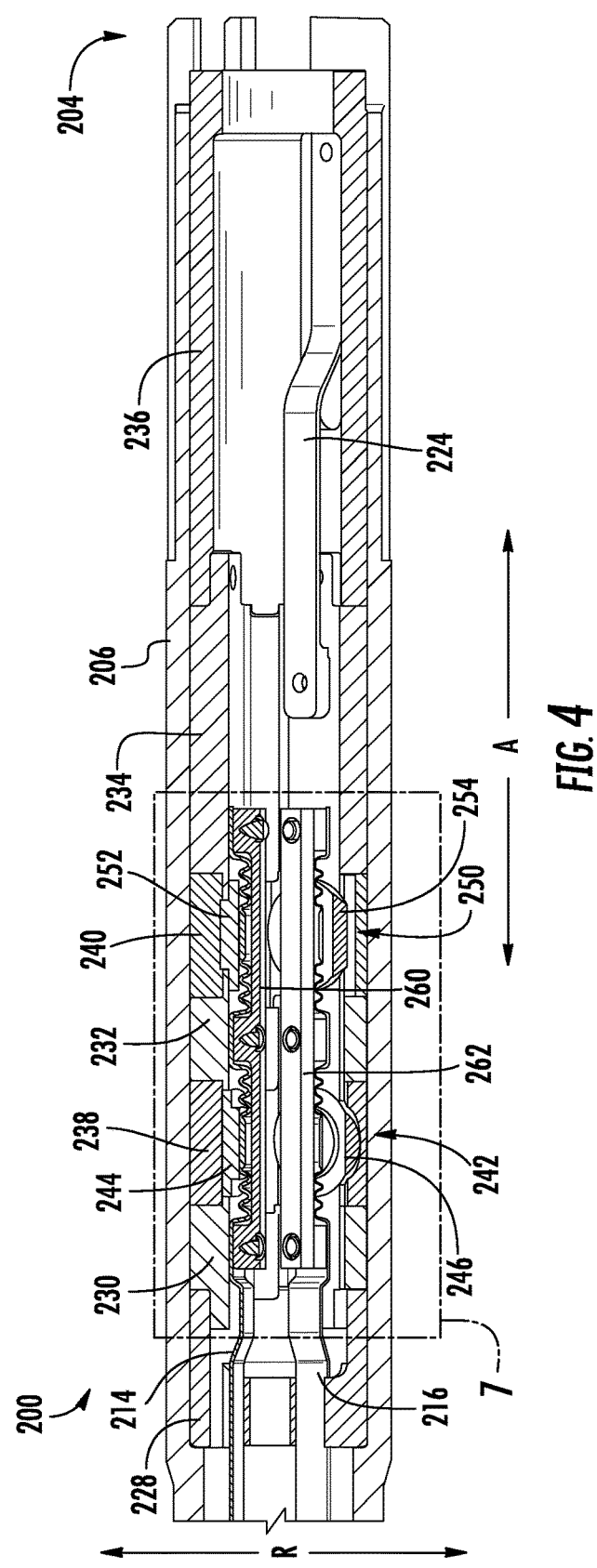

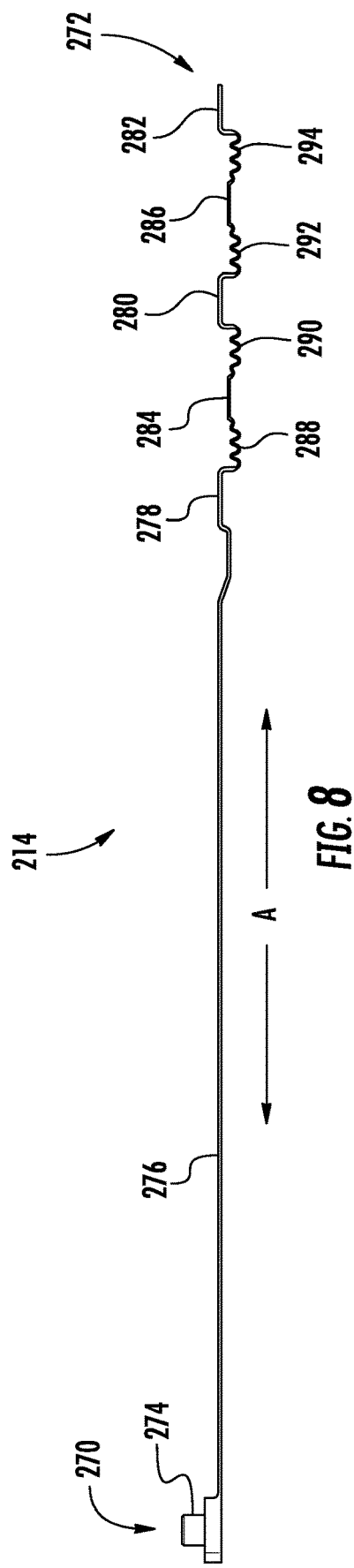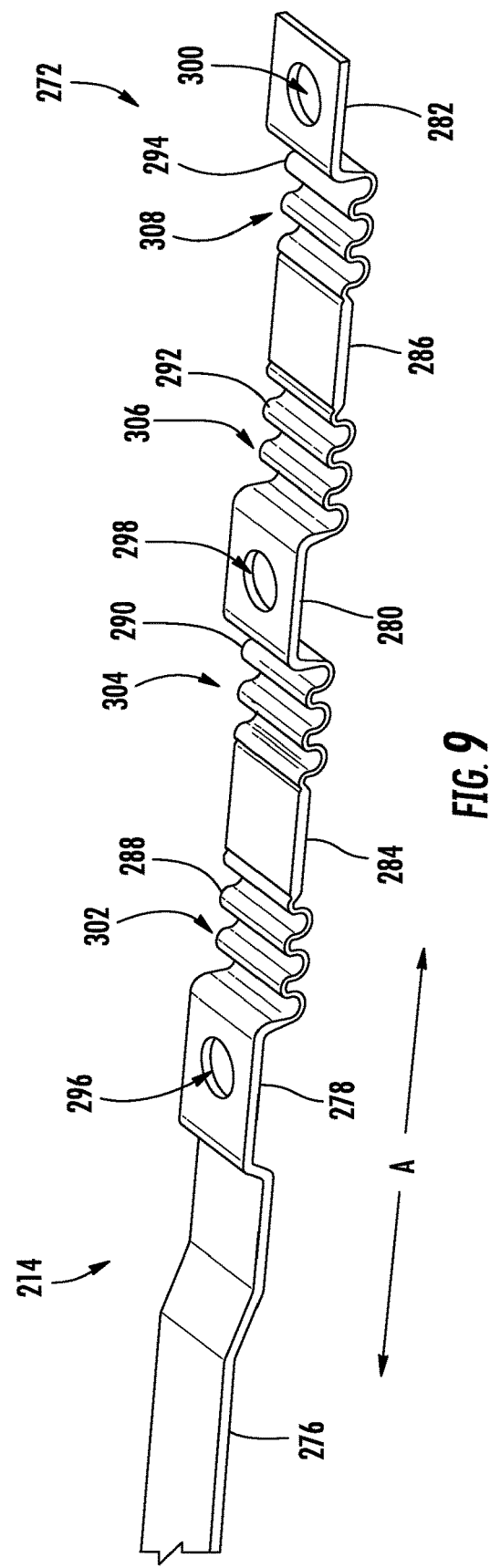

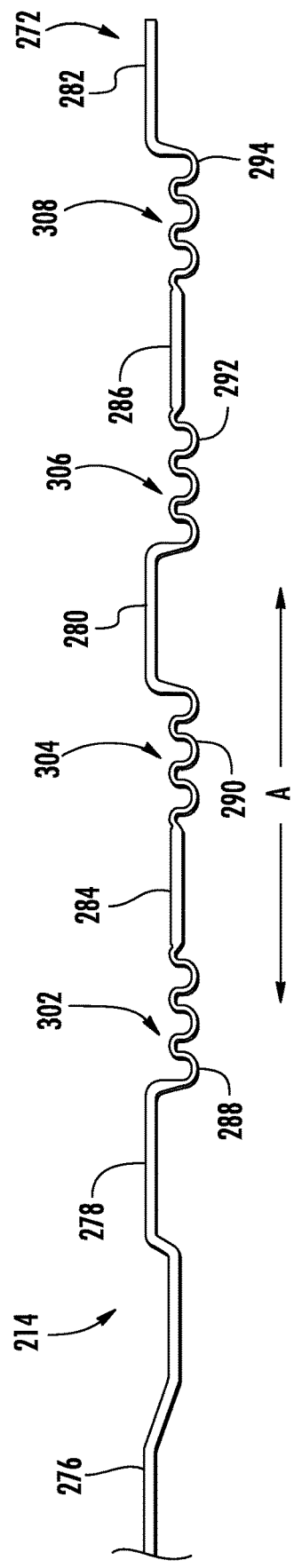
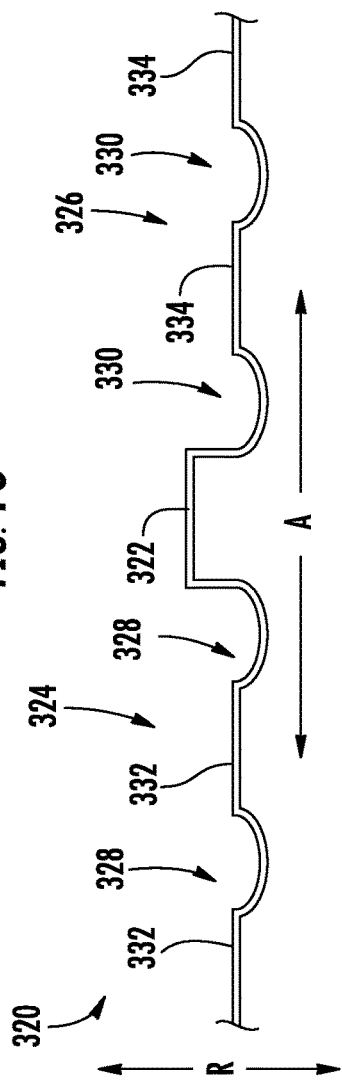
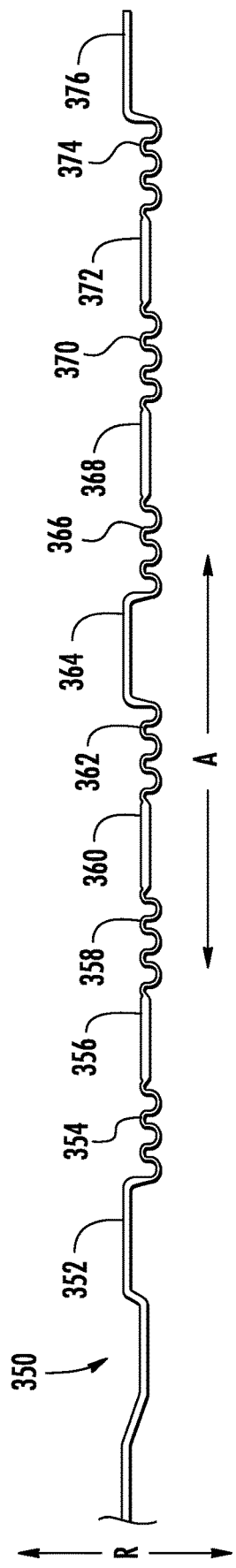

FLEXIBLE MECHANICAL SUPPORT SYSTEM FOR DIODES IN A ROTATING RECTIFIER

CROSS REFERENCE TO RELATED APPLICATIONS

The present application claims priority to Indian Patent Application No. 202011037519, filed on Aug. 31, 2020.

FIELD

The present subject matter relates generally to rotating rectifiers, such as rotating rectifiers for electric machines.

BACKGROUND

An aircraft can include a variety of components, including electrical power systems for the generation of electrical power for various loads included onboard the aircraft. Some electrical power systems can include electric machines, such as electric motors and/or electric generators. In the aircraft industry, it is common to find combination motor-generators, where a motor is used to power a generator, and, depending on the configuration, the motor also functions as a generator. Regardless of the configuration, generators typically include a rotor having main windings that are driven to rotate by a source of rotation, such as an electrical or mechanical machine, which for some aircraft may be a gas turbine engine. In some applications, the generators initially generate alternating current (AC), which is rectified to generate direct current (DC) for DC components on the aircraft.

Some electrical machines include two stages: an exciter and a main. Each stage extracts more power from the mechanical rotation of the machine. In order to run, the exciter requires a field current on its stator to produce more current on its rotor. Likewise, the main requires a field current on its rotor to produce more current on its stator. The current from the exciter supplies the current into the main. Because the current from the rotor of the exciter is AC, but the field current into the rotor of the main must be DC, a rectifier is needed to convert the AC current into DC current. However, because this rectifier is on the rotating part of the electric machine, the rectifier and its electrical components can be subject to a wide range of operating conditions, including harsh conditions. In some instances, the contact between diodes of the rectifier and exciter leads can become loose, resulting in a gap between the diodes and the exciter leads. This may result in arcing and/or other failures.

Accordingly, a rotating rectifier that addresses one or more of the challenges noted above would be useful.

BRIEF DESCRIPTION OF THE DRAWINGS

Detailed discussion of embodiments directed to one of ordinary skill in the art are set forth in the specification, which makes reference to the appended figures, in which:

FIG. 3 provides a side view of a rotating rectifier according to one example embodiment of the present disclosure;

FIG. 4 provides a side cross-sectional view of the rotating rectifier of FIG. 3;

FIG. 8 provides a side view of an exciter connection lead of the rotating rectifier of FIG. 3;

FIG. 9 provides a close-up perspective view of the exciter connection lead of FIG. 8;

FIG. 10 provides a close-up side view of the exciter connection lead of FIG. 8;

FIG. 11 provides a close-up side view of an exciter connection lead for a rotating rectifier according to one example embodiment of the present disclosure; and FIG. 12 provides a close-up side view of another exciter connection lead for a rotating rectifier according to one example embodiment of the present disclosure.

DETAILED DESCRIPTION

Figure 1:
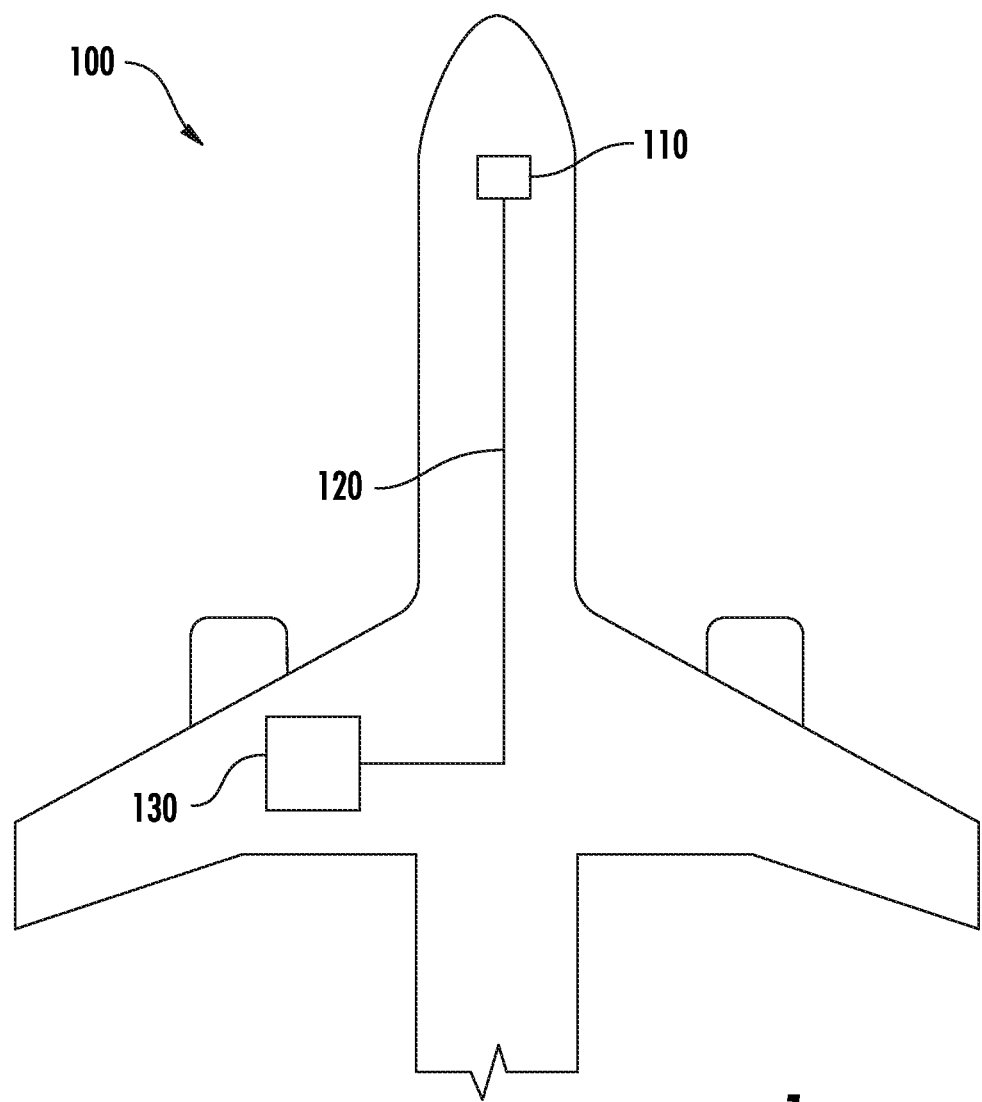
FIG. 1 provides a schematic view of an aircraft in accordance with example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used in the specification and the appended claims, the singular forms "a," "an," and "the" include plural referents unless the context clearly dictates otherwise. As used herein, the terms "first", "second", and "third" may be used interchangeably to distinguish one component from another and are not intended to signify location or relative importance of the individual components. The use of the term "about" in conjunction with a numerical value refers to within 25% of the stated amount.

Example aspects of the present disclosure are directed to a rotating rectifier associated with an electric machine. Particularly, a rotating rectifier is provided that includes a flexible mechanical support system. The flexible mechanical support system is embodied in connection leads having flexible, spring-action segments that improve the mechanical contact between the connection leads and diodes of the rotating rectifier. In this manner, improved reliability of the rotating rectifier can be achieved.

In one aspect, a rotating rectifier can be associated with an electric machine, such as a three-stage aviation synchronous generator that requires DC power to magnetize the main rotor. The rotating rectifier can be rotatably mounted on a shaft of the electric machine and can convert AC power into DC power, e.g., so that DC power can be provided to magnetize the main rotor of the generator. The rotating rectifier can include a diode in communication with a bus bar. The diode can be one diode of a stage of diodes. The rotating rectifier can include multiple axial stages of diodes.

The rotating rectifier can also include a connection lead, such an exciter connection lead. The connection lead can be one of a plurality of connection leads of the rotating rectifier.

The connection lead has a diode contact segment in contact with one of the diodes. The connection lead also has a first spring segment and a second spring segment positioned on opposite sides of the diode contact segment. The first spring segment and the second spring segment can both be positioned adjacent to the diode contact segment. The first spring segment and the second spring segment each have one or more spring laps. The spring laps can be non-planar spring laps, such as undulating spring laps, elliptical, circular, helical, and/or spiral spring laps. The spring segments positioned on opposite sides can facilitate mechanical contact between the diode contact segment and its associated diode with spring action, which as noted above, can improve the reliability of the rotating rectifier.

FIG. 1 provides a schematic view of an example aircraft 100 in accordance with example embodiments of the present disclosure. As depicted, the aircraft 100 includes a control system 110. The aircraft 100 also includes an electrical power system 120. The electrical power system 120 can be used to power one or more loads on the aircraft 100. The electrical power system 120 includes one or more electric machine assemblies 130 that can be used to generate power. The electric machine assemblies 130 can include or be associated with a rotating rectifier.

Figure 2:
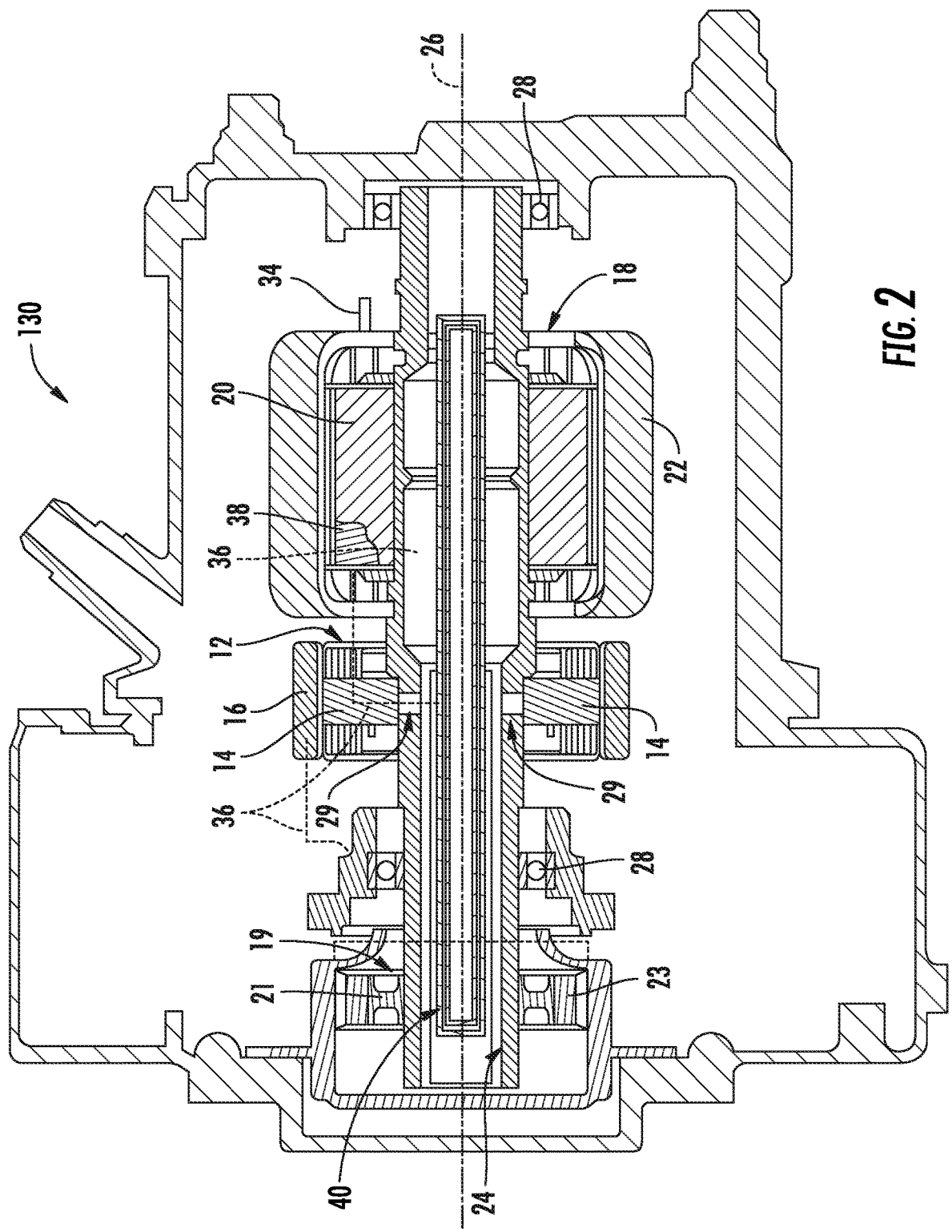
FIG. 2 provides a cross-sectional view of an electrical machine according to example embodiments of the present disclosure.

FIG. 2 provide a schematic cross-sectional view of an example electric machine assembly 130 according to one example embodiment of the present disclosure. The electric machine assembly 130 has a first machine 12 (e.g., an exciter) having an exciter rotor 14 and an exciter stator 16. The electric machine assembly 130 also has a second machine 18 (e.g., a main machine) having a main machine rotor 20 and a main machine stator 22. The electric machine assembly 130 further includes a permanent magnet generator (PMG) 19 having a PMG rotor 21 and a PMG stator 23. At least one power connection is provided on the exterior of the electric machine assembly 130 to provide for the transfer of electrical power to and from the electric machine assembly 130. Power is transmitted by this power connection, shown as an electrical power cable 34, to the electrical load and may provide for a three-phase output with a ground reference from the electric machine assembly 130.

The electric machine assembly 130 further includes a thermally conductive rotatable shaft 24 mechanically coupled to a source of axial rotation, which may be a gas turbine engine (not shown), about a common axis 26. The rotatable shaft 24 is supported by spaced bearings 28 and includes access openings 29 radially spaced about the shaft 24. The exciter rotor 14, main machine rotor 20, and PMG rotor 21 are mounted to the rotatable shaft 24 for rotation relative to the stators 16, 22, 23 which are rotationally fixed within the electric machine assembly 130. The stators 16, 22, 23 may be mounted to any suitable part of a housing portion of the electric machine assembly 130.

The rotatable shaft 24 includes a hollow portion for enclosing a rotating rectifier 40. The rotating rectifier 40 is rotationally coupled with the rotatable shaft 24. The rotating rectifier 40 can include an outer sleeve or shaft formed of a non-electrically conductive material that electrically insulates the internal electrical components of the rotating rectifier 40 from the rotatable shaft 24.

The exciter rotor 14 is electrically connected to various electrical components of the rotating rectifier 40 by way of conductors 36 (schematically shown as dotted lines). Additionally, the electrical components of the rotating rectifier 40 is electrically connected to main windings 38 of the main machine rotor 20 by way of conductors 36. The PMG stator 23 may also be electrically connected to the exciter stator 16 by way of conductors 36.

Figure 5:
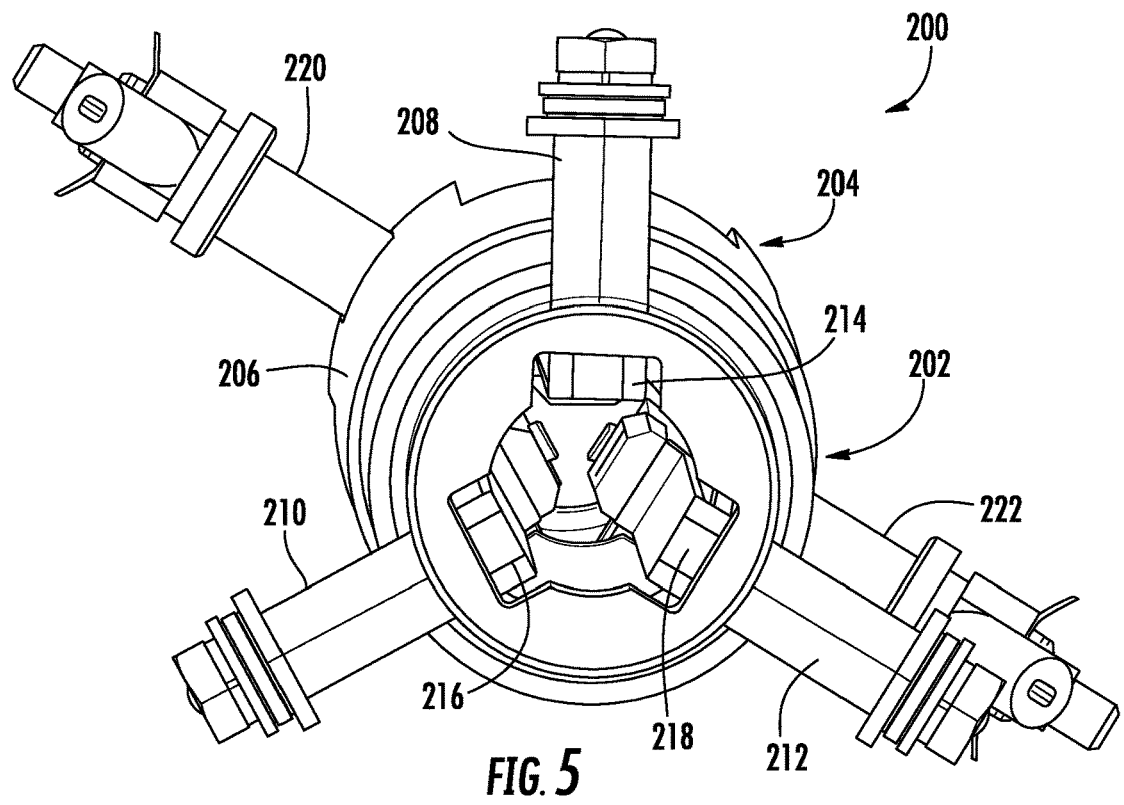
FIG. 5 provides a close-up view of a first end of the rotating rectifier of FIG. 3.
Figure 6:
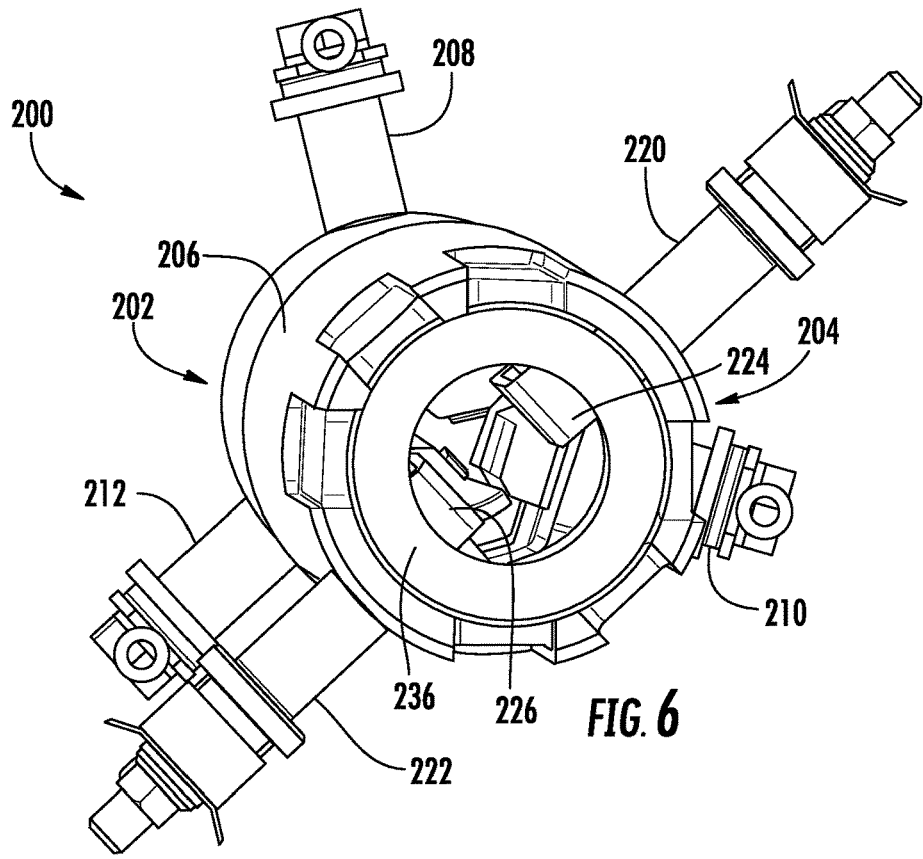
FIG. 6 provides a close-up view of a second end of the rotating rectifier of FIG. 3.

FIGS. 3, 4, 5, and 6 provide various views of a rotating rectifier 200 according to one example embodiment of the present disclosure. Particularly, FIG. 3 provides a side view of the rotating rectifier 200. FIG. 4 provides a side cross-sectional view of the rotating rectifier 200. FIG. 5 provides a close-up view of a first end of the rotating rectifier 200. FIG. 6 provides a close-up view of a second end of the rotating rectifier 200. The rotating rectifier 200 disclosed herein can be implemented as the rotating rectifier 40 of FIG. 2. However, it will be appreciated that the inventive aspects of the rotating rectifier 200 disclosed herein can be used or associated with any suitable electric machine without deviating from the scope of the present disclosure. For instance, the rotating rectifier 200 described herein can be implemented in or associated with any synchronous generator, motor, and/or other application that uses a rotating rectifier.

For reference, the rotating rectifier 200 defines an axial direction A, a radial direction R, and a circumferential direction C. In addition, the rotating rectifier 200 defines an axial centerline or longitudinal axis LA that extends along the axial direction A. Generally, the axial direction A extends parallel to the longitudinal axis LA, the radial direction R extends outward from and inward to the longitudinal axis LA in a direction orthogonal to the axial direction A, and the circumferential direction C extends three hundred sixty degrees (360°) around the longitudinal axis LA.

As shown, the rotating rectifier 200 extends between a first end 202 and a second end 204, e.g., along the axial direction A. The rotating rectifier 200 has an outer sleeve 206 that extends between the first end 202 and the second end 204 of the rotating rectifier 200. The outer sleeve 206 is generally a hollow tubular member. The rotating rectifier 200 has exciter terminal connectors extending through the outer sleeve 206 at the first end 202. For this embodiment, the rotating rectifier 200 includes three exciter terminal connectors, including a first exciter terminal connector 208, a second exciter terminal connector 210, and a third exciter terminal connector 212. The exciter terminal connectors 208, 210, 212 extend longitudinally (lengthwise) through the outer sleeve 206 along the radial direction R and are circumferentially spaced from one another along the circumferential direction C. Specifically, the exciter terminal connectors 208, 210, 212 are evenly spaced from one another along the circumferential direction C, e.g., by 120°. In other embodiments, it will be appreciated that the rotating rectifier 200 can include more or less than three exciter terminal connectors.

Each exciter terminal connector 208, 210, 212 is connected to a corresponding exciter connection lead (shown best in FIG. 5). Particularly, the first exciter terminal connector 208 is connected to a first exciter connection lead 214, the second exciter terminal connector 210 is connected to a second exciter connection lead 216, and a third exciter terminal connector 212 is connected to a third exciter connection lead 218. Like the exciter terminal connectors 208, 210, 212, the exciter connection leads 214, 216, 218 are spaced from one another along the circumferential direction C, e.g., by 120°. The exciter connection leads 214, 216, 218 each extend longitudinally along the axial direction A. The exciter connection leads 214, 216, 218 can be formed of an electrically conductive material, such as copper. The exciter connection leads 214, 216, 218 can collectively carry three-phase AC power received from an exciter (e.g., from the exciter or first machine 12 of FIG. 2).

The rotating rectifier 200 has main terminal connectors extending through the outer sleeve 206 at the second end 204. For this embodiment, the rotating rectifier 200 includes two exciter terminal connectors, including a first main terminal connector 220 and a second main terminal connector 222. The main terminal connectors 220, 222 extend longitudinally (lengthwise) through the outer sleeve 206 along the radial direction R and are circumferentially spaced from one another along the circumferential direction C. In other embodiments, it will be appreciated that the rotating rectifier 200 can include more or less than three main terminal connectors.

Each main terminal connector 220, 222 is connected to a corresponding main connection lead (shown best in FIG. 6). Particularly, the first main terminal connector 220 is connected to a first main connection lead 224 and the second main terminal connector 222 is connected to a second main connection lead 226. Like the main terminal connectors 220, 222, the main connection leads 224, 226 are spaced from one another along the circumferential direction C. The main connection leads 224, 226 each extend longitudinally along the axial direction A.

Figure 7:
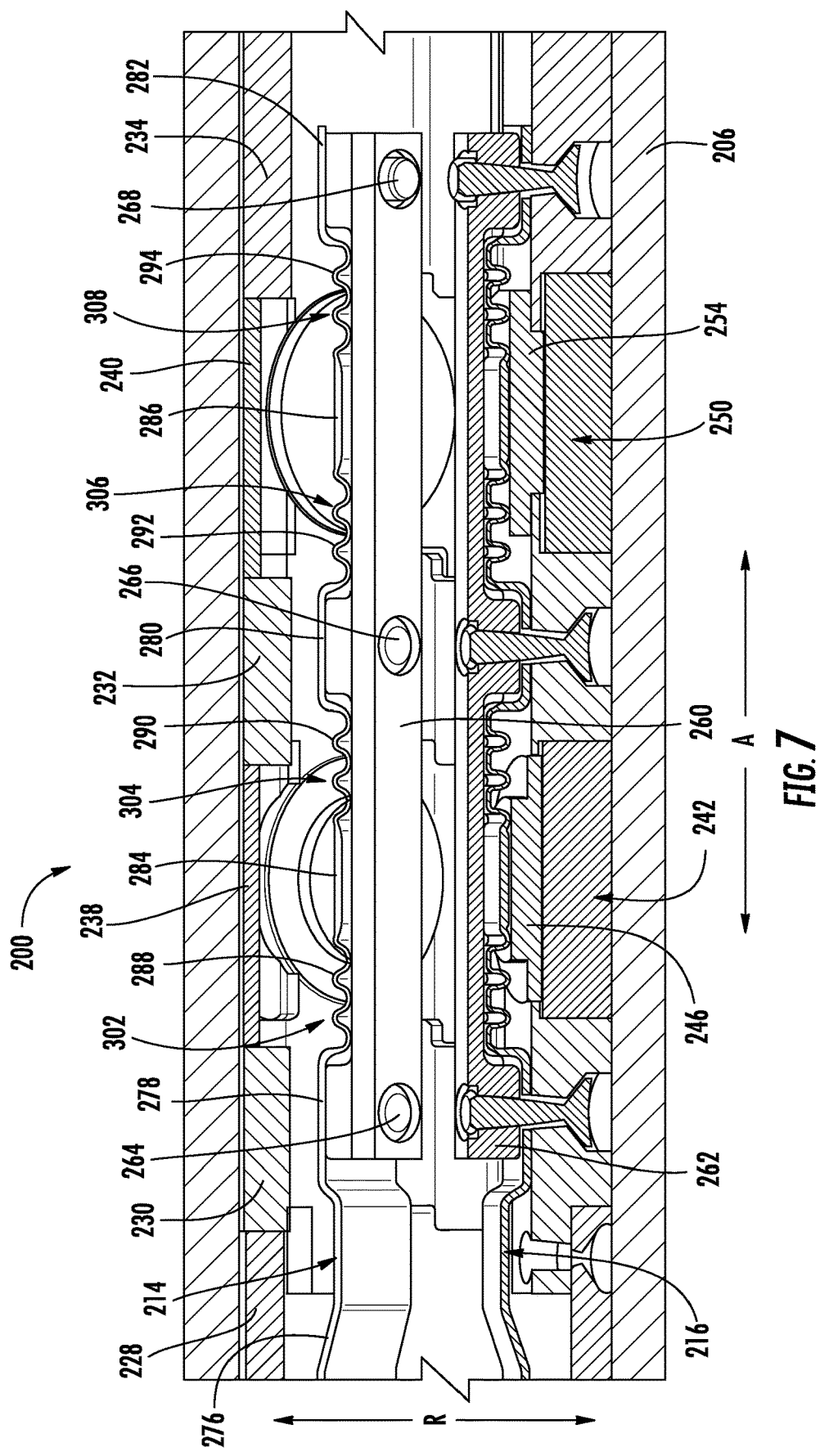
FIG. 7 provides a close-up view of Section 7 depicted in FIG. 4.

With reference now to FIGS. 4 and 7, FIG. 7 provides a close-up view of Section 7 depicted in FIG. 4. As shown, the rotating rectifier 200 has one or more interior sleeves encased within the outer sleeve 206. Particularly, the rotating rectifier 200 includes a first interior sleeve 228. The first interior sleeve 228 defines three circumferentially spaced channels in which a corresponding exciter connection lead 214, 216, 218 is received. The first interior sleeve 228 can be formed of a non-metallic material, for example. The first interior sleeve 228 is connected to a second interior sleeve 230. Thus, the first interior sleeve 228 is positioned adjacent the second interior sleeve 230 along the axial direction A. The second interior sleeve 230 can be formed of a non-metallic material, for example. The rotating rectifier 200 also includes a third interior sleeve 232, a fourth interior sleeve 234, and a fifth interior sleeve 236. The third, fourth, and fifth interior sleeves 232, 234, 236 can each be formed of a non-metallic material.

A first bus bar 238 is positioned between the second interior sleeve 230 and the third interior sleeve 232, e.g., along the axial direction A. The first bus bar 238 is an annular member formed of an electrically conductive material. The first bus bar 238 can have a first electrical polarity, e.g., a positive electrical polarity. Moreover, the rotating rectifier 200 includes a first stage of diodes 242. Each diode of the first stage is electrically connected to the first bus bar 238. For this embodiment, the first stage of diodes 242 includes a first diode 244, a second diode 246, and a third diode (not shown in FIGS. 4 and 7). The first diode 244, the second diode 246, and the third diode are spaced from one another along the circumferential direction C. As will be explained in more detail herein, the first diode 244 is in contact with the first exciter connection lead 214, the second diode 246 is in contact with the second exciter connection lead 216, and the third diode is in contact with the third exciter connection lead 218. Accordingly, each diode of the first stage is in contact with a corresponding exciter connection lead.

A second bus bar 240 is positioned between the third interior sleeve 232 and the fourth interior sleeve 234, e.g., along the axial direction A. Like the first bus bar 238, the second bus bar 240 is an annular member formed of an electrically conductive material. The second bus bar 240 can have a second electrical polarity, e.g., a negative electrical polarity. The third interior sleeve 232 electrically isolates the first bus bar 238 from the second bus bar 240. Further, the rotating rectifier 200 includes a second stage of diodes 250. Each diode of the second stage is electrically connected to the second bus bar 240. For the present embodiment, the second stage of diodes 250 includes a first diode 252, a second diode 254, and a third diode (not shown in FIGS. 4 and 7). The first diode 252, the second diode 254, and the third diode are spaced from one another along the circumferential direction C. The second stage of diodes 250 is spaced from the first stage of diodes 242, e.g., along the axial direction A. As will be explained in more detail herein, the first diode 252 of the second stage is in contact with the first exciter connection lead 214, the second diode 254 of the second stage is in contact with the second exciter connection lead 216, and the third diode of the second stage is in contact with the third exciter connection lead 218. Accordingly, each diode of the second stage is in contact with a corresponding exciter connection lead.

The rotating rectifier 200 further includes lead support blocks that each support a corresponding exciter connection lead. For this embodiment, the rotating rectifier 200 includes a first lead support block 260 that supports the first exciter connection lead 214. The first lead support block 260 is connected to the second interior sleeve 230, the third interior sleeve 232, and the fourth interior sleeve 234. Fasteners 264, 266, 268 can extend through the first exciter connection lead 214 and connect the first lead support block 260 to the noted interior sleeves 230, 232, 234. The fasteners can be bolts, for example. The rotating rectifier 200 also includes a second lead support block 262 that supports the second exciter connection lead 216 and a third lead support block (not shown in FIGS. 4 and 7) that supports the third exciter connection lead 218. The second lead support block 262 and the third lead support block can support their respective exciter connection leads 216, 218 in the same manner that the first lead support block 260 supports the first exciter connection lead 214. Like the exciter connection leads 214, 216, 218, the lead support blocks are spaced from one another along the circumferential direction C.

As shown best in FIG. 4, the fourth interior sleeve 234 is connected to the fifth interior sleeve 236. The fourth interior sleeve 234 is positioned adjacent the fifth interior sleeve 236, e.g., along the axial direction A. As noted above, the fourth interior sleeve 234 is connected to the second bus bar 240 at its end opposite the end that connects with the fifth interior sleeve 236. The first main connection lead 224 and the second main connection lead 226 (see FIGS. 4 and 6) each extend from the second end 204 of the rotating rectifier 200 and connect to the fourth interior sleeve 234.

With reference now to FIGS. 7, 8, 9, and 10, the construction of the exciter connection leads and their interface with the diodes and other components of the rotating rectifier 200 will now be described in more detail. FIG. 8 provides a side view of the first exciter connection lead 214 of the rotating rectifier 200. FIG. 9 provides a close-up perspective view of the first exciter connection lead 214. FIG. 10 provides a close-up side view of the first exciter connection lead 214. The construction of the first exciter connection lead 214 is representative of the construction of the other exciter connection leads of the rotating rectifier 200. That is, the other exciter connection leads can be constructed in the same or similar manner as the first exciter connection lead 214. Moreover, the manner in which the first exciter connection lead 214 interfaces with the other components of the rotating rectifier 200 is representative of how the other exciter connection leads can interface with components of the rotating rectifier 200. Thus, in the interest of brevity, only the construction and the manner in which the first exciter connection lead 214 interfaces with the other components of the rotating rectifier 200 will be described.

Generally, the first exciter connection lead 214 extends between a terminal end 270 and a distal end 272, e.g., along the axial direction A. The first exciter connection lead 214 has a terminal 274 at its terminal end 270. The terminal 274 electrically connects the first exciter connection lead 214 with the first exciter terminal connector 208. The terminal 274 of the first exciter connection lead 214 is connected to a delivery segment 276 of the first exciter connection lead 214.

The first exciter connection lead 214 has a plurality of other segments that interface with other components of the rotating rectifier 200. Particularly, the first exciter connection lead 214 has a first attachment segment 278, a second attachment segment 280 spaced from the first attachment segment 278, and a first diode contact segment 284 positioned between the first and second attachment segments 278, 280. Accordingly, the first attachment segment 278 is spaced from the second attachment segment 280 along the axial direction A and the first diode contact segment 284 is positioned between the first and second attachment segments 278, 280 along the axial direction A. The first attachment segment 278 is connected with the delivery segment 276. The first diode contact segment 284 is in contact with the first diode 244 of the first stage of diodes 242, which is aligned with the first bus bar 238 along the axial direction A. A planar surface of the first diode contact segment 284 contacts a planar surface of the first diode 244 of the first stage of diodes 242.

The first exciter connection lead 214 also has a third attachment segment 282 spaced from the first and second attachment segments 278, 280. The second attachment segment 280 is positioned between the first and third attachment segments 278, 282, e.g., along the axial direction A. Further, the first exciter connection lead 214 has a second diode contact segment 286 in contact with the first diode 252 of the second stage of diodes 250, which is aligned with the second bus bar 240 along the axial direction A. A planar surface of the second diode contact segment 286 contacts a planar surface of the first diode 252 of the second stage of diodes 250. The first, second, and the third attachment segments 278, 280, 282 are planar and the first and second diode contact segments 284, 286 are also planar. The first, second, and the third attachment segments 278, 280, 282 each define respective openings 296, 298, 300 as shown in FIG. 9.

As shown best in FIG. 7, one of the fasteners 264 extends through the opening 296 (FIG. 9) of the first attachment segment 278 and connects the second interior sleeve 230 with the first lead support block 260. One of the fasteners 266 extends through the opening 298 (FIG. 9) of the second attachment segment 280 and connects the third interior sleeve 232 with the first lead support block 260. One of the fasteners 268 extends through the opening 300 of the third attachment segment 282 and connects the fourth interior sleeve 234 with the first lead support block 260. In this manner, the first exciter connection lead 214 is secured and supported in place.

Notably, the first exciter connection lead 214 has a first spring segment 288 and a second spring segment 290 positioned on opposite sides of the first diode contact segment 284. Particularly, the first spring segment 288 is positioned between the first attachment segment 278 and the first diode contact segment 284 and the second spring segment 290 is positioned between the first diode contact segment 284 and the second attachment segment 280, e.g., along the axial direction A. The first exciter connection lead 214 also has a third spring segment 292 and a fourth spring segment 294 positioned on opposite sides of the second diode contact segment 286. Specifically, the third spring segment 292 is positioned between the second attachment segment 280 and the second diode contact segment 286 and the fourth spring segment 294 is positioned between the second diode contact segment 286 and the third attachment segment 282, e.g., along the axial direction A.

As depicted, the first, second, third, and the fourth spring segments 288, 290, 292, 294 each have one or more spring laps 302, 304, 306, 308, respectively. The one or more spring laps 302, 304, 306, 308 of the spring segments 288, 290, 292, 294 are non-planar spring laps in this example embodiment. Particularly, for this embodiment, the one or more spring laps 302, 304, 306, 308 of the spring segments 288, 290, 292, 294 are undulating spring laps. That is, the spring laps 302, 304, 306, 308 are formed by undulations. In this example, the spring segments 288, 290, 292, 294 each have at least three undulating spring laps.

Advantageously, the undulating spring segments 288, 290, 292, 294 positioned on opposite sides of the diode contact segments 284, 286 reduce the stress on the first exciter connection lead 214 and increase and better maintain the contact between the diode contact segments 284, 286 and their respective diodes 244, 252. Particularly, the spring segments 288, 290, 292, 294 increase the flexibility of the first exciter connection lead 214, allowing for more deformation along the radial direction R within elastic limits. The increased flexibility of the lead allows the diode contact segments 284, 286 to maintain contact with their respective diodes with spring-like action in the radial direction R. This may increase the reliability of the rotating rectifier 200 under all operating conditions, among other benefits. In this way, the connection lead provides a flexible mechanical support system for the diodes of the rotating rectifier.

FIG. 11 provides a close-up side view of an exciter connection lead 320 for a rotating rectifier according to one example embodiment of the present disclosure. The exciter connection lead 320 can be incorporated into the rotating rectifier 200 disclosed above or some other suitable rotating rectifier. The exciter connection lead 320 of FIG. 11 is configured in a similar manner as the first exciter connection lead 214 disclosed above except as noted below.

For this embodiment, the exciter connection lead 320 has a diode contact segment 322 that contacts a diode (not shown), e.g., when the exciter connection lead 320 is implemented in a rotating rectifier. The exciter connection lead 320 also has a first spring segment 324 and a second spring segment 326 positioned on opposite sides of the diode contact segment 322. The first spring segment 324 and the second spring segment 326 each have one or more spring laps. The first spring segment 324 has one or more spring laps 328 and the second spring segment 326 has one or more spring laps 330. For this embodiment, instead of the spring laps 328, 330 being undulating spring laps or undulations as in the depicted embodiment of FIGS. 3 through 10, the spring laps 328, 330 are elliptical laps. The elliptical laps are spaced between planar sections 332, 334, e.g., along the axial direction A.

The spring segments 324, 326 increase the flexibility of the exciter connection lead 320, allowing for more deformation along the radial direction R within elastic limits. The increased flexibility of the lead allows the diode contact segment 322 to maintain contact with an associated diode with spring-like action in the radial direction R. This may increase the reliability of the rotating rectifier in which the connection lead 320 is implemented, among other benefits. Although connection leads having undulating spring laps and elliptical spring laps have been disclosed herein, the spring laps of the spring segments can have other suitable non-planar profiles as well, such as circular, helical, and spiral profiles. Further, it will be appreciated that the size, angle, length, height, and width of the spring laps can be varied based on manufacturing methods and the required flexibility to hold the leads in contact with their associated diodes.

FIG. 12 provides a close-up side view of another exciter connection lead 350 for a rotating rectifier according to one example embodiment of the present disclosure. The exciter connection lead 350 can be incorporated into the rotating rectifier 200 disclosed above or some other suitable rotating rectifier. The exciter connection lead 350 of FIG. 12 is configured in a similar manner as the first exciter connection lead 214 disclosed above except as noted below.

For this embodiment, moving from left to right in FIG. 12, the exciter connection lead 350 has a first attachment segment 352, a first spring segment 354, a first diode contact segment 356, a second spring segment 358, a second diode contact segment 360, a third spring segment 362, a second attachment segment 364, a fourth spring segment 366, a third diode contact segment 368, a fifth spring segment 370, a fourth diode contact segment 372, a sixth spring segment 374, and a third attachment segment 376. Each diode contact segment 356, 360, 368, 372 contacts a diode (not shown), e.g., when the exciter connection lead 350 is implemented in a rotating rectifier. Further, each spring segment 354, 358, 362, 366, 370, 374 has one or more spring laps, which are undulating spring laps in this example embodiment. However, the exciter connection lead 350 can have other suitable non-planar spring laps, such as any of those described herein.

Notably, for the depicted embodiment of FIG. 12, there are two diode contact segments positioned between the attachment segments. Particularly, the first diode contact segment 356 and the second diode contact segment 360 are positioned between the first attachment segment 352 and the second attachment segment 364, e.g., along the axial direction A. Further, the third diode contact segment 368 and the fourth diode contact segment 372 are positioned between the second attachment segment 364 and the third attachment segment 376, e.g., along the axial direction A.

In addition, for the depicted embodiment of FIG. 12, spring segments are positioned adjacent to and on opposite sides of each diode contact segment. Specifically, the first spring segment 354 and the second spring segment 358 are positioned adjacent to and on opposite sides of the first diode contact segment 356. The second spring segment 358 and the third spring segment 362 are positioned adjacent to and on opposite sides of the second diode contact segment 360. The fourth spring segment 366 and the fifth spring segment 370 are positioned adjacent to and on opposite sides of the third diode contact segment 368. The fifth spring segment 370 and the sixth spring segment 374 are positioned adjacent to and on opposite sides of the fourth diode contact segment 372.

As will be appreciated in view of the disclosure above, multiple stages of diodes can be accommodated between attachment segments of the exciter connection lead 350 and spring segments can be positioned adjacent to and on opposite sides of each diode contact segment as shown in FIG. 12. In this way, the exciter connection lead 350 of FIG. 12 can provide a flexible mechanical support system for diodes of a scaled-up configuration of a rotating rectifier.

The connection leads disclosed herein can be manufactured by various manufacturing methods, including by wire EDM (Electrical Discharge Machining), EDM, electroforming, and/or additive manufacturing processes. Indeed, such processes can enable the disclosed profile of the excitation connection leads disclosed herein. Moreover, such processes can enable an excitation connection lead to be manufactured as a monolithic or unitary body member. Accordingly, the terminal, delivery segment, and the entirety of the interface portion of the exciter connection lead that includes the attachment, diode contact, and spring segments can be manufactured as a monolithic component.

In some embodiments, the connection lead can be formed by an electric discharge machining process. In some embodiments, the connection lead can be formed by a wire electric discharge machining process. In some embodiments, the connection lead is formed by an additive manufacturing process. In some embodiments, the connection lead is formed by an electroforming process.

With respect to additive manufacturing, as noted above, the components described herein may be manufactured or formed using an additive-manufacturing process, such as a 3D printing process. The use of such a process may allow the components to be formed integrally, as a single monolithic component. In particular, the manufacturing process may allow these components to be integrally formed and include a variety of features not possible when using prior manufacturing methods. For example, the additive manufacturing methods described herein enable the manufacture of components having various features, configurations, thicknesses, materials, densities, surface variations, and identifying features not possible using prior manufacturing methods.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component having a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, but are not limited to, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent, for example, a photo-curable polymer or another liquid bonding agent, onto each layer of powder. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed by fusing material, e.g., by polymerizing a plastic using laser energy or heat or by sintering or melting metal powder. For example, a particular type of additive manufacturing process may use an energy beam, like an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

Notably, in exemplary embodiments, several aspects and features of the present subject matter were previously not possible due to manufacturing restraints. However, the present inventors have advantageously utilized current advances in additive manufacturing techniques to improve various components and the method of additively manufacturing such components. While the present disclosure is not limited to the use of additive manufacturing to form these components generally, additive manufacturing does provide a variety of manufacturing advantages, including ease of manufacturing, reduced cost, greater accuracy, etc.

Also, the additive manufacturing methods described above enable much more complex and intricate shapes and contours of the components described herein to be formed with a very high level of precision. For example, such components may include thin additively manufactured layers, cross-sectional features, and component contours. In addition, the additive manufacturing process enables the manufacture of a single component having different materials such that different portions of the component may exhibit different performance characteristics. The successive, additive nature of the manufacturing process enables the construction of these novel features. As a result, components formed using the methods described herein may exhibit improved performance and reliability.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims and can include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

1. A rotating rectifier associated with an electric machine, the rotating rectifier comprising: a diode; and a connection lead having a diode contact segment in contact with the diode and a first spring segment and a second spring segment positioned on opposite sides of the diode contact segment, the first spring segment and the second spring segment each having one or more spring laps.
2. The rotating rectifier of any preceding clause, wherein the one or more spring laps of the first spring segment and the second spring segment are non-planar spring laps.
3. The rotating rectifier of any preceding clause, wherein the one or more spring laps of the first spring segment and the second spring segment are undulating spring laps.
4. The rotating rectifier of any preceding clause, wherein the one or more spring laps of the first spring segment and the second spring segment are elliptical spring laps.
5. The rotating rectifier of any preceding clause, wherein the connection lead has a first attachment segment and a second attachment segment spaced from the first attachment segment, and wherein the diode contact segment is positioned between the first and second attachment segments.
6. The rotating rectifier of any preceding clause, wherein the first spring segment is positioned between the first attachment segment and the diode contact segment and the second spring segment is positioned between the second attachment segment and the diode contact segment.
7. The rotating rectifier of any preceding clause, wherein the diode is a first diode, the rotating rectifier further comprising: a second diode spaced from the first diode, and wherein the connection lead has a third attachment segment spaced from the first and second attachment segments, the second attachment segment being positioned between the first and third attachment segments, and wherein the connection lead has a second diode contact segment in contact with the second diode and a third spring segment and a fourth spring segment positioned on opposite sides of the second diode contact segment, the third spring segment and the fourth spring segment each having one or more spring laps.
8. The rotating rectifier of any preceding clause, wherein the third spring segment is positioned between the second attachment segment and the second diode contact segment and the fourth spring segment is positioned between the second diode contact segment and the third attachment segment.
9. The rotating rectifier of any preceding clause, further comprising: an outer sleeve; one or more interior sleeves encased within the outer sleeve; a lead support block; and fasteners, and wherein one of the fasteners extends through the first attachment segment and connects one of the one or more interior sleeves with the lead support block, one of the fasteners extends through the second attachment segment and connects one of the one or more interior sleeves with the lead support block, and one of the fasteners extends through the third attachment segment and connects one of the one or more interior sleeves with the lead support block.
10. The rotating rectifier of any preceding clause, wherein the diode contact segment is planar.
11. The rotating rectifier of any preceding clause, wherein the connection lead is formed by an electric discharge machining process.
12. The rotating rectifier of any preceding clause, wherein the connection lead is formed by an additive manufacturing process.
13. The rotating rectifier of any preceding clause, wherein the connection lead is one of a plurality of exciter connection leads of the rotating rectifier.
14. A rotating rectifier associated with an electric machine, the rotating rectifier comprising: a diode; and a connection lead having a first attachment segment, a second attachment segment spaced from the first attachment segment, and a diode contact segment positioned between the first and second attachment segments, the diode contact segment being in contact with the diode, the connection lead further having a first spring segment positioned between the first attachment segment and the diode contact segment and a second spring segment positioned between the second attachment segment and the diode contact segment, the first spring segment and the second spring segment each having undulating spring laps.

15. The rotating rectifier of any preceding clause, wherein the first spring segment and the second spring segment each have at least three undulating spring laps.

16. The rotating rectifier of any preceding clause, further comprising: a second diode; and wherein the connection lead has a second diode contact segment and a third spring segment, the second diode contact segment being in contact with the second diode, the second diode contact segment being positioned between the second spring segment and the third spring segment, the third spring segment being positioned between the second diode contact segment and the second attachment segment.

17. The rotating rectifier of any preceding clause, wherein the diode contact segment is positioned between and adjacent to the first and second attachment segments.

18. A rotating rectifier associated with an electric machine, the rotating rectifier comprising: an outer sleeve; one or more interior sleeves encased within the outer sleeve; a lead support block; a diode; fasteners; and a connection lead having a first attachment segment, a second attachment segment spaced from the first attachment segment, and a diode contact segment positioned between the first and second attachment segments, the diode contact segment being in contact with the diode, the connection lead further having a first spring segment positioned between the first attachment segment and the diode contact segment and a second spring segment positioned between the second attachment segment and the diode contact segment, the first spring segment and the second spring segment each having non-planar spring laps, and wherein one of the fasteners extends through the first attachment segment and connects one of the one or more interior sleeves with the lead support block and one of the fasteners extends through the second attachment segment and connects one of the one or more interior sleeves with the lead support block.

19. The rotating rectifier of any preceding clause, wherein the non-planar spring laps of the first spring segment and the second spring segment are undulating spring laps.

20. The rotating rectifier of any preceding clause, wherein the diode contact segment is positioned between and adjacent to the first and second attachment segments.

What is claimed is:

1. A rotating rectifier associated with an electric machine, the rotating rectifier defining an axial direction and comprising:
    a diode; and
    a connection lead having a diode contact segment in contact with the diode and a first spring segment and a second spring segment positioned on opposite sides of the diode contact segment along the axial direction, wherein the first spring segment includes a plurality of undulating spring laps arranged adjacent to one another, and wherein the second spring segment includes a plurality of undulating spring laps arranged adjacent to one another.

2. The rotating rectifier of claim 1, wherein the first spring segment and the second spring segment include non-planar spring laps.

3. The rotating rectifier of claim 1, wherein the first spring segment and the second spring segment include elliptical spring laps.

4. The rotating rectifier of claim 1, wherein the connection lead has a first attachment segment and a second attachment segment spaced from the first attachment segment, and wherein the diode contact segment is positioned between the first and second attachment segments.

5. The rotating rectifier of claim 4, wherein the first spring segment is positioned between the first attachment segment and the diode contact segment and the second spring segment is positioned between the second attachment segment and the diode contact segment.

6. The rotating rectifier of claim 4, wherein the diode is a first diode, the rotating rectifier further comprising:
    a second diode spaced from the first diode, and
    wherein the connection lead has a third attachment segment spaced from the first and second attachment segments, the second attachment segment being positioned between the first and third attachment segments, and wherein the connection lead has a second diode contact segment in contact with the second diode and a third spring segment and a fourth spring segment positioned on opposite sides of the second diode contact segment, the third spring segment and the fourth spring segment each having one or more spring laps.

7. The rotating rectifier of claim 6, wherein the third spring segment is positioned between the second attachment segment and the second diode contact segment and the fourth spring segment is positioned between the second diode contact segment and the third attachment segment.

8. The rotating rectifier of claim 6, further comprising:
    an outer sleeve;
    one or more interior sleeves encased within the outer sleeve;
    a lead support block; and
    fasteners, and
    wherein one of the fasteners extends through the first attachment segment and connects one of the one or more interior sleeves with the lead support block, one of the fasteners extends through the second attachment segment and connects one of the one or more interior sleeves with the lead support block, and one of the fasteners extends through the third attachment segment and connects one of the one or more interior sleeves with the lead support block.

9. The rotating rectifier of claim 1, wherein the connection lead is formed by an electric discharge machining process.

10. The rotating rectifier of claim 1, wherein the connection lead is formed by an additive manufacturing process.

11. The rotating rectifier of claim 1, wherein the first spring segment, the second spring segment, and the diode contact segment are formed integrally together.

12. A rotating rectifier associated with an electric machine and defining an axial direction, the rotating rectifier comprising:
    a diode; and
    a connection lead having a first attachment segment, a second attachment segment spaced from the first attachment segment, and a diode contact segment positioned between the first and second attachment segments along the axial direction, the diode contact segment being in contact with the diode, the connection lead further having a first spring segment positioned between the first attachment segment and the diode contact segment along the axial direction and a second spring segment positioned between the second attachment segment and the diode contact segment along the axial direction, wherein the first spring segment includes a plurality of undulating spring laps arranged adjacent to one another, and wherein the second spring segment includes a plurality of undulating spring laps arranged adjacent to one another.

13. The rotating rectifier of claim 12, wherein the first spring segment and the second spring segment each have at least three undulating spring laps.

14. The rotating rectifier of claim 12, further comprising:
a second diode; and
wherein the connection lead has a second diode contact segment and a third spring segment, the second diode contact segment being in contact with the second diode, the second diode contact segment being positioned between the second spring segment and the third spring segment, the third spring segment being positioned between the second diode contact segment and the second attachment segment.

15. The rotating rectifier of claim 12, wherein the diode contact segment is positioned between and adjacent to the first and second attachment segments.

16. A rotating rectifier associated with an electric machine, the rotating rectifier defining an axial direction comprising:
an outer sleeve;
one or more interior sleeves encased within the outer sleeve;
a lead support block;
a diode;
fasteners; and
a connection lead having a first attachment segment, a second attachment segment spaced from the first attachment segment, and a diode contact segment positioned between the first and second attachment segments along the axial direction, the diode contact segment being in contact with the diode, the connection lead further having a first spring segment positioned between the first attachment segment and the diode contact segment along the axial direction and a second spring segment positioned between the second attachment segment and the diode contact segment along the axial direction, wherein the first spring segment includes a plurality of undulating spring laps arranged adjacent to one another, and wherein the second spring segment includes a plurality of undulating spring laps arranged adjacent to one another, and
wherein one of the fasteners extends through the first attachment segment and connects one of the one or more interior sleeves with the lead support block and one of the fasteners extends through the second attachment segment and connects one of the one or more interior sleeves with the lead support block.

17. The rotating rectifier of claim 16, wherein the diode contact segment is positioned between and adjacent to the first and second attachment segments.

* * * * *